US008767368B2

(12) United States Patent
Yoneda

(10) Patent No.: US 8,767,368 B2
(45) Date of Patent: Jul. 1, 2014

(54) PROTECTIVE ELEMENT AND METHOD FOR PRODUCING THE SAME

(75) Inventor: Yoshihiro Yoneda, Ishikawa (JP)

(73) Assignee: Dexerials Corporation, Tokyo (JP)

( * ) Notice: Subject to any disclaimer, the term of this patent is extended or adjusted under 35 U.S.C. 154(b) by 856 days.

(21) Appl. No.: 12/988,199

(22) PCT Filed: Mar. 2, 2009

(86) PCT No.: PCT/JP2009/053870

§ 371 (c)(1),
(2), (4) Date: May 9, 2011

(87) PCT Pub. No.: WO2009/130946

PCT Pub. Date: Oct. 29, 2009

(65) Prior Publication Data

US 2011/0211284 A1 Sep. 1, 2011

(30) Foreign Application Priority Data

Apr. 21, 2008 (JP) ............................... P2008-109779

(51) Int. Cl.
*H02H 5/04* (2006.01)

(52) U.S. Cl.
USPC .......................................................... 361/104

(58) Field of Classification Search
None
See application file for complete search history.

(56) References Cited

U.S. PATENT DOCUMENTS 3,763,454 A * 10/1973 Zandonatti .................... 337/404
3,796,981 A * 3/1974 Poitras .......................... 337/239
5,744,713 A * 4/1998 Wienand et al. ........... 73/204.26
5,770,993 A * 6/1998 Miyazawa et al. ............ 337/160
7,426,117 B2 * 9/2008 Van Schuylenbergh et al. ............................ 361/760
2005/0218525 A1 * 10/2005 Takahashi et al. ............ 257/772

FOREIGN PATENT DOCUMENTS

JP 53-42145 4/1978
JP 55-090279 1/1982
JP 57-107530 7/1982
JP 58-133873 3/1985
JP 62-149335 4/1989
JP 03-001418 1/1991
JP 09-306319 11/1997
JP 2004-363630 12/2004

OTHER PUBLICATIONS

International Search Report dated Apr. 6, 2009, for corresponding Patent Application No. PCT/JP2009/053870.

* cited by examiner

*Primary Examiner* — Jared Fureman
*Assistant Examiner* — Terrence Willoughby
(74) *Attorney, Agent, or Firm* — K&L Gates LLP

(57) ABSTRACT

The protective element includes an elastic member firmly adhered through a solder to second conductor layers and current-carrying electrode terminals formed on a prescribed substrate in such a manner to divide a current-carrying path in plural to form an electric current interruption portion. The solder has a liquid-phase point higher than a mounting temperature at which the protective element is mounted to a protection target device. The elastic member is soldered onto the second conductor layers and the current-carrying electrode terminals in a state that the elastic member maintains a level of stress allowing at least one of the current-carrying electrode terminals among the second conductor layers and the current-carrying electrode terminals to be separated from the elastic member by deformation of the solder even in a case where the solder is not completely melted.

17 Claims, 14 Drawing Sheets

PROTECTIVE ELEMENT AND METHOD FOR PRODUCING THE SAME

CROSS REFERENCE TO RELATED APPLICATIONS

The present application is a National Stage of International Application No. PCT/JP2009/053870 filed on Mar. 2, 2009 and which claims priority to Japanese Patent Application No. JP2008-109779 filed on Apr. 21, 2008 the entire contents of which are being incorporated herein by reference.

BACKGROUND

The present disclosure relates to a protective element interrupting an electric current in case of an unusual situation of a protection target device, and to a method for producing a protective element.

A related art chip-shaped protective element including a low-melting point metallic body (fuse element) disposed on a substrate has been known to prevent overcurrent associated with an unusual situation of a protection target device. In such a related art protective element, the fuse element blows when overcurrent is applied thereto in case of unusual situations. The blown fuse element is attracted to an electrode by good wettability with respect to an electrode surface on which the fuse element is placed. In the related art protective element, therefore, electric current is interrupted by blowing the fuse element.

Another related art chip-shaped protective element has also been known to prevent not only the overcurrent but also overvoltage. Herein, the related art chip-shaped protective element includes a heat generation resistor and a fuse element which are laminated on a substrate. In such a related art protective element, the electric current is applied to the heat generation resistor in case of the unusual situation, so that the fuse element is blown by heat generated by the heat generation resistor. The blown fuse element is attracted to an electrode by good wettability with respect to an electrode surface on which the fuse element is placed. In such a related art protective element, therefore, the electric current is interrupted by blowing the fuse element.

Each of such related art protective elements is generally mounted on a base circuit board of the protection target device by reflow soldering. Accordingly, the fuse element is made of a material having a high solid-phase point relative to a mounting temperature in order to prevent the fuse element from blowing when the related art protective element is mounted on the base circuit board. In addition, a method for mounting a related art protective element at a mounting temperature has been proposed (e.g., Patent Document 1). Herein, the mounting temperature is lower relative to the liquid-phase point of the fuse element while being higher relative to a solid-phase point of the fuse element.

Moreover, each of Patent Documents 2 and 3 discloses a related art protective element capable of interrupting the electric current using an elastic member in order to prevent the overcurrent or the overvoltage without disposing a fuse element.

Patent Document 1: Japanese Unexamined Patent Application Publication No. 2004-363630

Patent Document 2: Japanese Unexamined Patent Application Publication No. H9-306319

Patent Document 3: Japanese Unexamined Utility Model Application Publication No. S53-42145

SUMMARY

A solder paste used for reflow soldering of a protective element and a solder foil serving as a fuse element are expected to be lead-free (or non-lead) in recent years to meet recent demands in compliance with environmental policies.

The popularization of the non-lead solder, however, has accelerated an increase in a mounting temperature. Accordingly, the fuse element is expected to have a liquid-phase point as well as a solid-phase point at a higher temperature.

Particularly, a reflow temperature has been increased to 260 degrees Celsius with the popularization of the lead-free solder. A practical lead-free solder serving as the fuse element needs to have the liquid-phase point or the solid-phase point greater than or equal to 260 degrees Celsius in order to prevent the fuse element from blowing when the protective element is mounted on a base circuit board. However, such a practical lead-free solder has not been founded. Herein, the practical lead-free solder, serving as the fuse element, has characteristics of interruption of the electric current by melting a solder foil at a temperature higher than or equal to 260 degrees Celsius and of meltdown of the solder foil using an aggregation force to minimize a surface area by surface tension thereof.

Such an increase in the temperature of the liquid-phase point or the solid-phase point of the fuse element can raise a problem that it can deteriorate responsiveness of the electric current interruption operation.

The present embodiments provide a protective element being applicable to reflow soldering and ensuring good responsiveness of electric current interruption operation even in a case where a solder to be used has a liquid-phase point or a solid-phase point higher than a mounting temperature. Moreover, the present embodiments provide a method for producing the protective element.

The present embodiments provide an original structure capable of ensuring good responsiveness of the electric current interruption operation even in a case where a solder to be used has a liquid-phase point or a solid-phase point higher than a mounting temperature.

According to the protective element of an embodiment, electric current is interrupted in case of an unusual situation of a protection target device. The protective element includes: an elastic member firmly adhered through a solder to a plurality of electrode terminals formed on a prescribed substrate in such a manner that a current-carrying path is divided into plural to form an electric current interruption portion. The solder has a liquid-phase point higher than a mounting temperature at which the protective element is mounted to the protection target device, and the liquid-phase point is higher than or equal to 260 degrees Celsius. The elastic member is soldered onto the electrode terminals in a state that the elastic member maintains a level of stress allowing at least one of the plural electrode terminals to be separated therefrom by deformation of the solder even in a state that the solder is not completely melted.

In an embodiment of the protective element, the elastic member is used as a connection member of an electric current interruption portion, and is firmly adhered to the electrode terminal by the solder. According to the protective element of the embodiment, the solder does not need to be melted completely in order for the electric current interruption, since the elastic member is soldered to the plural electrode terminals in a state that the elastic member maintains a level of stress allowing at least one of the plural electrode terminals to be separated therefrom by deformation of the solder even in a state that the solder is not completely melted. Accordingly, the protective element of the present embodiment can interrupt the electric current by physically separating the elastic member from the electrode terminal by the stress of the elastic member at a stage in which the solder is melted to a certain level.

According to another embodiment, a method for producing a protective element interrupting an electric current in case of an unusual situation of a protection target device is provided. The method for producing the protective element includes: a first step allowing a solder, having a liquid-phase point higher than a mounting temperature at which the protective element is mounted to the protection target device, to be applied on a plurality of electrode terminals formed on a prescribed substrate in such a manner that a current-carrying path is divided into plural to form an electric current interruption portion; a second step allowing a prescribed elastic member to be mounted in such a manner to be laid across the plural electrode terminals applied with the solder; and a third step allowing the elastic member to be firmly adhered to the plural electrode terminals in a state that the elastic member is urged by allowing the solder to be cooled down after being heated and melted in a state that the elastic member is flexed in contact with the solder. The third step allows the elastic member to be soldered onto the electrode terminals in a state that the elastic member maintains a level of stress allowing at least one of the plural electrode terminals to be separated therefrom by deformation of the solder even in a state that the solder is not completely melted.

According to another embodiment, a method for producing a protective element interrupting an electric current in case of an unusual situation of a protection target device is provided. The method for producing the protective element includes: a first step allowing a solder, having a liquid-phase point higher than a mounting temperature at which the protective element is mounted to the protection target device, to be applied on a plurality of electrode terminals formed on a prescribed substrate in such a manner that a current-carrying path is divided into plural to form an electric current interruption portion; a second step allowing a prescribed elastic member to be mounted in such a manner to be laid across the plural electrode terminals applied with the solder; a third step allowing the elastic member to be firmly adhered to the plural electrode terminals by allowing the solder to be cooled down after the solder is heated and melted in a state that the elastic member is mounted on the solder; and a forth step allowing the elastic member to be flexed and urged using a prescribed stand-off member. The third step allows the elastic member to be soldered onto the electrode terminals in a state that the elastic member maintains a level of stress allowing at least one of the plural electrode terminals to be separated therefrom by deformation of the solder even in a state that the solder is not completely melted.

According to the method for producing the protective element of the embodiment, the protective element, including the elastic member used as a connection member of an electrical current interruption portion and firmly adhered to the electrode terminal by the solder, can be easily produced. According to the protective element produced by such a method, the solder does not need to be melted completely in order for the electric current interruption since the protective element including the elastic member is soldered to the plural electrode terminals in a state of maintaining a level of stress allowing at least one of the plural electrode terminals to be separated therefrom by deformation of the solder even in a state that the solder is not completely melted. Accordingly, the protective element of the present invention can interrupt the electric current by physically separating the elastic member from the electrode terminal by the stress of the elastic member at a stage in which the solder is melted to a certain level.

According to a protective element of the embodiments, a solder does not need to be melted completely in order to interrupt the electric current, and an elastic member is connected to an electrode terminal of a current interrupt portion using the solder in such a manner that the elastic member is physically separated from the electrode terminal by the stress of the elastic member at a stage in which the solder is melted to a certain level. Therefore, the protective element not only can ensure good responsiveness of the electric current interruption operation even in a case where the solder to be used has a liquid-phase point or a solid-phase point higher than a mounting temperature, but also can be applied to reflow soldering.

Additional features and advantages are described herein, and will be apparent from, the following Detailed Description and the figures.

DETAILED DESCRIPTION

Hereinafter, embodiments will be described in detail with reference to the drawings.

A protective element according to the embodiments is connected in series to a current-carrying path of a protection target device to interrupt an electric current in case of an unusual situation of the protection target device. Particularly, the protective element allows usage of an elastic member, serving as a connection member of an electric current interruption portion, instead of a fuse element, and the elastic member is connected to a current-carrying electrode terminal of the electric current interruption portion using a solder, thereby controlling application of the electric current or the interruption of the electric current.

A description is now given of the protective element according to a first embodiment.

Figure 1:
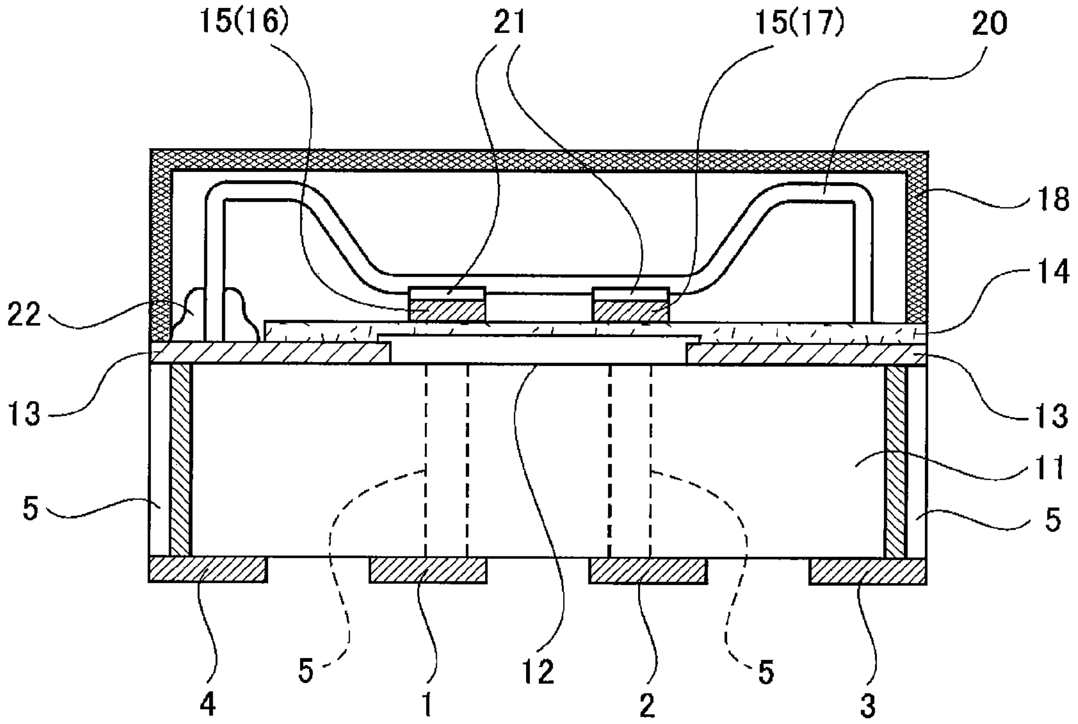
FIG. 1 is a cross-sectional side view illustrating an internal structure of a protective element according to a first embodiment.
Figure 2:
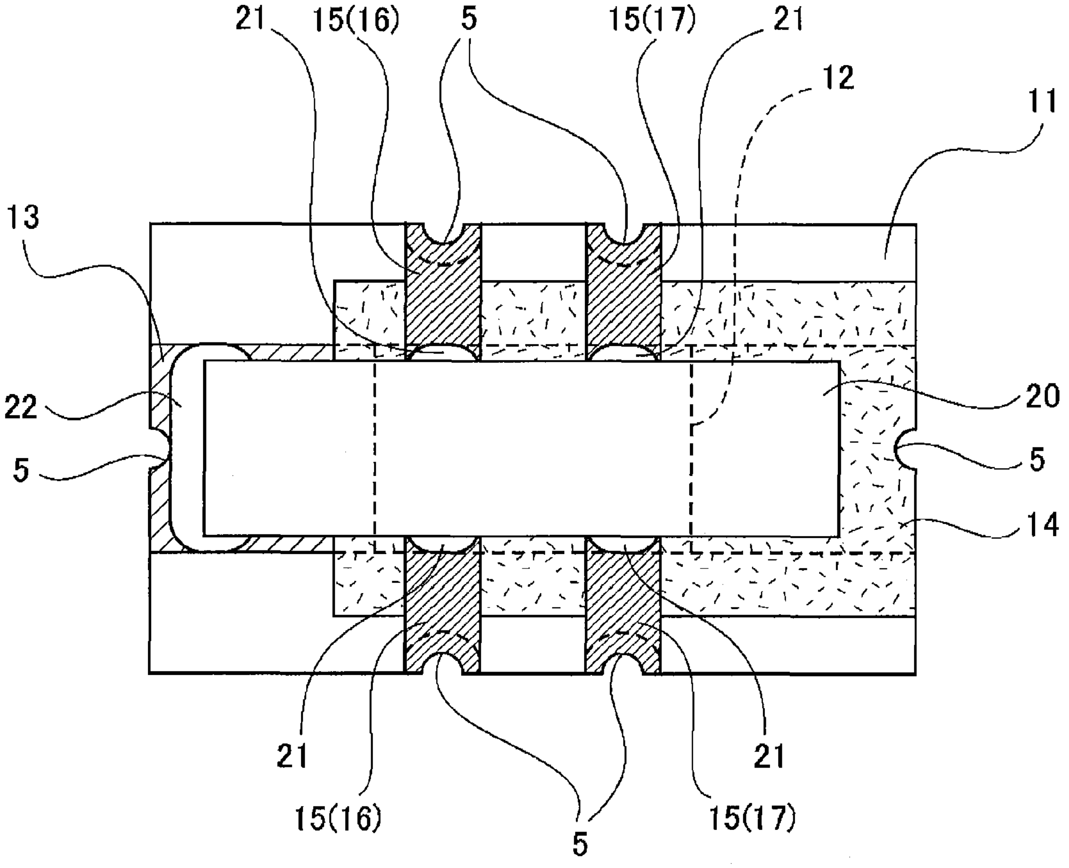
FIG. 2 is a plane view illustrating the internal structure of the protective element according to the first embodiment.

The protective element includes a heat generation resistor (heater) 12 and a first conductor layer 13 on a substrate 11 having a prescribed size as illustrated in a cross-sectional view of FIG. 1 and a plane view of FIG. 2. The heat generation resistor 12 generates the heat by the electric current applied in case of the unusual situation of the protection target device. The first conductor layer 13 is electrically connected to the heat generation resistor 12.

The substrate 11 can be any circuit board made of a material having an insulation property. For example, a glass substrate, a resin substrate, and an insulated metal substrate can be used as the substrate 11 in addition to a substrate used for a printed wiring board such as a ceramic substrate or a glass epoxy substrate. Among these substrates, the ceramic substrate serving as an insulating substrate having a good heat-resisting property and thermal conductivity is preferred. The substrate 11 includes a bottom surface having: current-carrying path terminals 1, 2 each of which forms a terminal of the current-carrying path; a heat generation resistor terminal 3 used for heating the heat generation resistor 12; and a non-connected mounting terminal 4 used for mounting the protective element on a base circuit board of the protection target device. The substrate 11 includes a side surface having side surface conductor layers 5 which are respectively connected to the current-carrying path terminals 1, 2, the heat generation resistor terminal 3, and the non-connected mounting terminal 4 in an electrical manner.

The heat generation resistor 12 is, for example, formed by applying a conductive material such as ruthenium oxide and a resistive paste on the substrate 11 and firing as necessary. Herein, the resistive paste is made of an inorganic binder such as water glass or an organic binder such as thermosetting resin. The heat generation resistor 12 can be formed by a series of processes including a printing process, a plating process, a vapor-deposition process, and a sputtering process performed to a thin film such as ruthenium oxide or carbon black. Alternatively, the heat generation resistor 12 can be formed by attachment of such a thin film or lamination of such thin films. The heat generation resistor 12 generates the heat by the electric current applied through the first conductor layer 13 and a side surface conductor layer 5 connected to the heat generation resistor terminal 3 with a decrease in a potential of the heat generation resistor terminal 3 in case of the unusual situation of the protection target device.

The first conductor layer 13 forms a heat generation resistor electrode terminal used for application of the electric current to the heat generation resistor 12. A material for the first conductor layer 13 is not particularly limited. However, the first conductor layer 13 is preferably made of metal having good wettability with a solder 22 (described later) since the first conductor layer 13 forms the current-carrying path. For example, the first conductor layer 13 can be made of Ag, AG-Pt, Ag—Pd, and the like, or can include a surface plated with metal.

Moreover, the protective element includes: second conductor layers 15 provided in a direction perpendicular to the first conductor layer 13; and two current-carrying electrode terminals 16, 17 provided in parallel to form the electric current interruption portion by dividing the current-carrying path into two. The second conductor layers 15 and the current-carrying electrode terminals 16, 17 are provided above the heat generation resistor 12 and the first conductor layer 13 through an insulation layer 14 such as glass.

The second conductor layers 15 and the current-carrying electrode terminals 16, 17 form the current-carrying path with the first conductor layer 13. Each of the second conductor layers 15 serves as the current-carrying electrode terminal as similar to the current-carrying electrode terminals 16, 17, and is disposed to increase the resistance against a large amount of the electric current to be flowed. Each of the second conductor layers 15 and the current-carrying electrode terminal 16, 17 is disposed through the insulation layer 14 in a state of being insulated from the heat generation resistor 12. The second conductor layers 15 and the current-carrying electrode terminal 16, 17 serve as electrode terminals disposed corresponding to the respective current-carrying path terminals 1, 2, and are formed in such a manner that the electric current is applied through the side surface conductor layers 5 connected to the respective current-carrying path terminals 1, 2. A material for each of the second conductor layers 15 and the current-carrying electrode terminal 16, 17 is not particularly limited. However, each of the second conductor layers 15 and the current-carrying electrode terminal 16, 17 is preferably made of metal having good wettability with a solder 21 since the second conductor layers 15 and the current-carrying electrode terminal 16, 17 form the current-carrying path. Particularly, each of the second conductor layers 15 and the current-carrying electrode terminal 16, 17 is formed of a material substantially the same as the first conductor layer 13 since each of the second conductor layers 15 and the current-carrying electrode terminal 16, 17 is usually formed by a production process which is same as the production of the first conductor layer 13. Arrangement relationships between the second conductor layers 15 as well as the current-carrying electrode terminals 16, 17 and the heat generation resistor 12 are not particularly limited as long as distances between the second conductor layers 15 as well as the current-carrying electrode terminals 16, 17 and an elastic member 20 (described later) are within a certain range in which the solder 21, firmly adhering the second conductor layers 15 and the current-carrying electrode terminals 16, 17 to the elastic member 20, is melted by the heat of the heat generation resistor 12. For example, the heat generation resistor 12 is disposed directly below the second conductor layers 15 and the current-carrying electrode terminals 16, 17. More particularly, the heat generation resistor 12 is disposed directly below a portion in which the elastic member 20 is at least laid across the second conductor layers 15 and the current-carrying electrode terminals 16, 17, so that the melting of the solder 21 is accelerated by the heat of the heat generation resistor 12, and the responsiveness of the electric current interruption operation is enhanced.

In the protective element, moreover, the elastic member 20 is disposed in a state of being firmly adhered to the second conductor layers 15 and the current-carrying electrode terminals 16, 17. The elastic member 20 is, for example, formed as a leaf spring member having conductivity, and is in a substantially letter U-shape when the elastic member 20 is not urged. The elastic member 20 in the substantially U-shape has two sides opposite to each other and has a side to be connected to the second conductor layers 15 and the current-carrying electrode terminals 16, 17. The two sides opposite to each other are urged in such a manner that a middle portion of the side to be connected is flexed inward, so that the elastic member 20 as a whole is formed in a substantially M-shape. The middle portion of the side is firmly adhered to the second conductor layers 15 and the current-carrying electrode terminals 16, 17 through the solder 21 in a state that the elastic member 20 is urged in the substantially M-shape. Accordingly, the elastic member 20 is electrically connected to the second conductor layers 15 and the current-carrying electrode terminals 16, 17. Moreover, the elastic member 20 includes one end positioned on the insulation layer 14, and includes another end positioned on the first conductor layer 13 serving as the heat generation resistor electrode terminal. The elastic member 20 is firmly adhered to the first conductor layer 13 through the solder 22, thereby being electrically connected to the first conductor layer 13. Accordingly, the elastic member 20 forms the current-carrying path. A material for the elastic member 20 is not particularly limited. However, the elastic member 20 is preferably made of metal having good wettability with solders 21, 22 since the elastic member 20 forms the current-carrying path. Moreover, the elastic member 20 is preferably made of metal having a tension strength or high hardness in addition to the elasticity from a standpoint of fully functioning as a conductive spring. For example, the elastic member 20 is preferably formed of phosphor bronze not only having a relatively low electric resistance and the good wettability with the solders 21, 22, but also having the elasticity, the high tension strength, the high hardness, a good abrasion resistance, and a good corrosion resistance.

The solders 21, 22 can be similar in composition or different in composition. Each of the solders 21, 22 can be made of a variety of low-melting point metallic bodies each of which has been conventionally used. For example, SnSb alloy, BiSnPb alloy, BiPbSn alloy, BiPb alloy, BiSn alloy, SnPb alloy, SnAg alloy, PbIn alloy, ZnAl alloy, InSn alloy, and PbAgSn alloy can be used. Particularly, each of the solders 21, 22 is preferably made of lead-free alloy such as the SnSb alloy and SnCu alloy from a standpoint of demand for lead-free. Among the solders 21, 22, the solder 21 has at least a liquid-phase point higher than a mounting temperature at which the protective element is mounted to the protection target device. Particularly, the solder 21 preferably has the liquid-phase point greater than equal to 260 degrees Celsius and lower than or equal to 350 degrees Celsius in consideration of the heat temperature of the heat generation resistor 12 in a case where the protective element is mounted to the protection target device by the reflow soldering. The fuse element in a related art protective element needs cohesion force of a melting solder to blow thereof with heat for interruption of the electric current. The solder 21, on the other hand, does not need the cohesion force, that is, surface tension property, as long as the solder 21 can allow the elastic member 20 to be separated from the second conductor layers 15 and the current-carrying electrode terminals 16, 17 by an increase in a stress (urging force) of the elastic member 20 to be higher than an adhesion force by physically reducing the adhesion force at a temperature (a melting point) of the solid-phase point or the liquid-phase point. In other words, the elastic member 20 needs to be soldered onto the second conductor layers 15 and the current-carrying electrode terminals 16, 17 in a state that the elastic member 20 maintains a level of the stress allowing at least one of the current-carrying electrode terminals among the second conductor layers 15 and the current-carrying electrode terminals 16, 17 to be separated from the elastic member 20 by deformation of the solder 21 even in a case where the solder 21 is not completely melted. Although an amount of the solders 21, 22 depends on an adhesion area with the heat generation resistor electrode terminal or the second conductor layers 15 and the current-carrying electrode terminals 16, 17, a small amount, for example, generally 0.5 mg to 2 mg is suffice.

Moreover, the protective element not only protects and regulates a behavior range of the elastic member 20, but also covers the elastic member 20 with an insulation housing 18, for example, made of liquid crystal polymer, thereby being produced as a chip member including an absorption area for automated component mounting with respect to an automated surface mount technology (SMT). The insulation housing 18 is shaped in cap with a hollow structure so as to reduce interferences in the electric current interruption operation performed by separating the elastic member 20 from the second conductor layers 15 and the current-carrying electrode terminals 16, 17. A space covered with the insulation housing 18 can include surfactant (not illustrated) made of flux and the like applied thereto to prevent or reduce surface oxidation of the insulation housing 18. Herein, the flux can be any publicly known flux such as rosin flux, and a viscosity thereof can be optionally selected.

Figure 3:
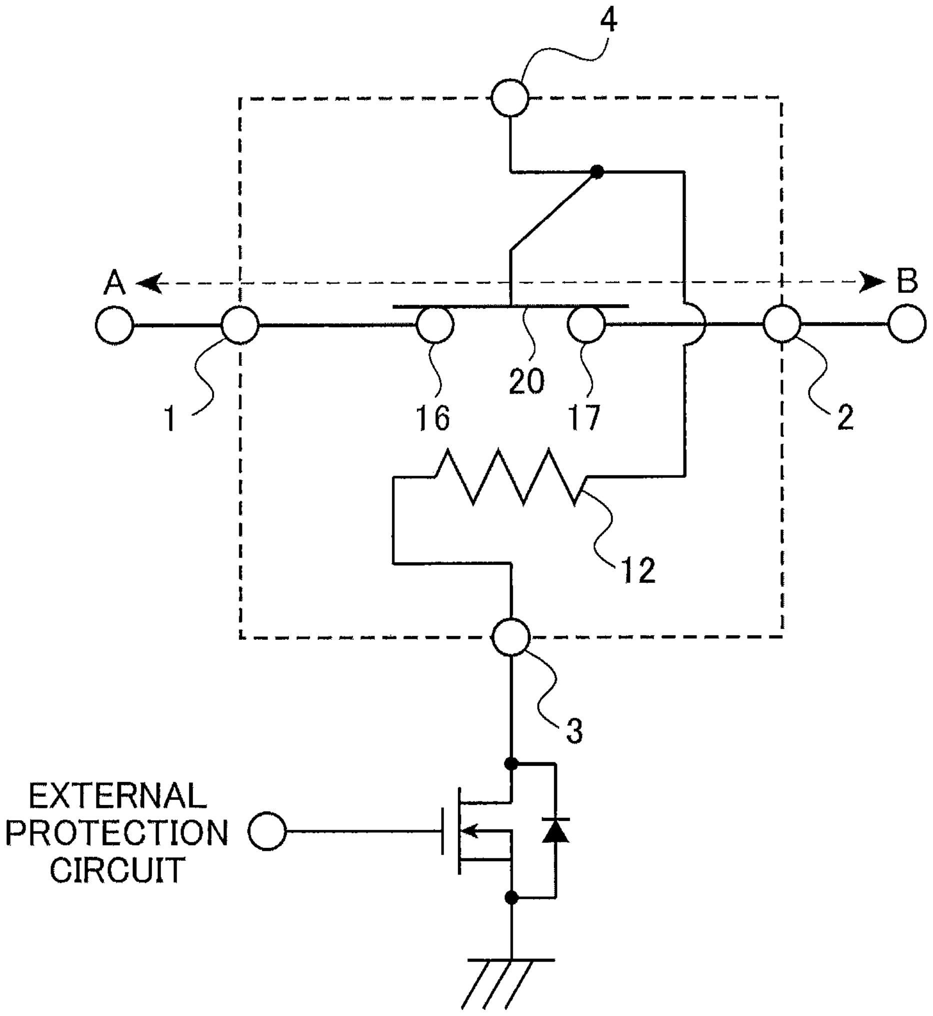
FIG. 3 is a schematic diagram illustrating a circuit structure of the protective element according to the first embodiment.

Referring to FIG. 3, a circuit structure of the protective element is illustrated. The protective element includes a current-carrying path A-B including the second conductor layers 15 as well as the current-carrying electrode terminals 16, 17 and the elastic member 20 disposed between at least the current-carrying path terminals 1, 2. The elastic member 20 is electrically connected to the first conductor layer 13 through the solder 22, so that the protective element allows the electric current to be applied to the generation resistor 12 through the current-carrying path A-B including the elastic member 20. In the protective element, therefore, when the heat generation resistor 12 generates the heat by the electric current applied from the current-carrying path A-B, the solder 21, connecting the elastic member 20 and at least one of the current-carrying electrode terminals among the second conductor layers 15 and the current-carrying electrode terminals 16, 17, is melted.

The heat generation resistor 12 has a resistance value which varies depending on a potential of the current-carrying path A-B. For example, in a case where the voltage of 12.6 V is assumed to be applied to the current-carrying path A-B, the heat generation resistor 12 preferably has the resistance value of approximately 5 Ω to 10Ω. Since the resistance value can vary depending on a condition such as a thermal conductive property of the substrate 11 or a premise of a temperature environment to be used, an appropriate resistance value needs to be verified with respect to each application or usage. The current-carrying path A-B, principally including the elastic member 20 and the solder 21, has the resistance value which is, for example designed to heat the elastic member 20 and the solder 21 in a case where the electric current more than double a rated current is flowed to the current-carrying path. The resistance value can vary depending the condition such as the rated current, a shape of the elastic member, a thickness of a member, a thermal conductivity rate. However, for example, in a case where the rated current is assumed to be 12 A, the current-carrying path A-B preferably has the resistance value of approximately 2 mΩ to 4 mΩ.

Figure 4:
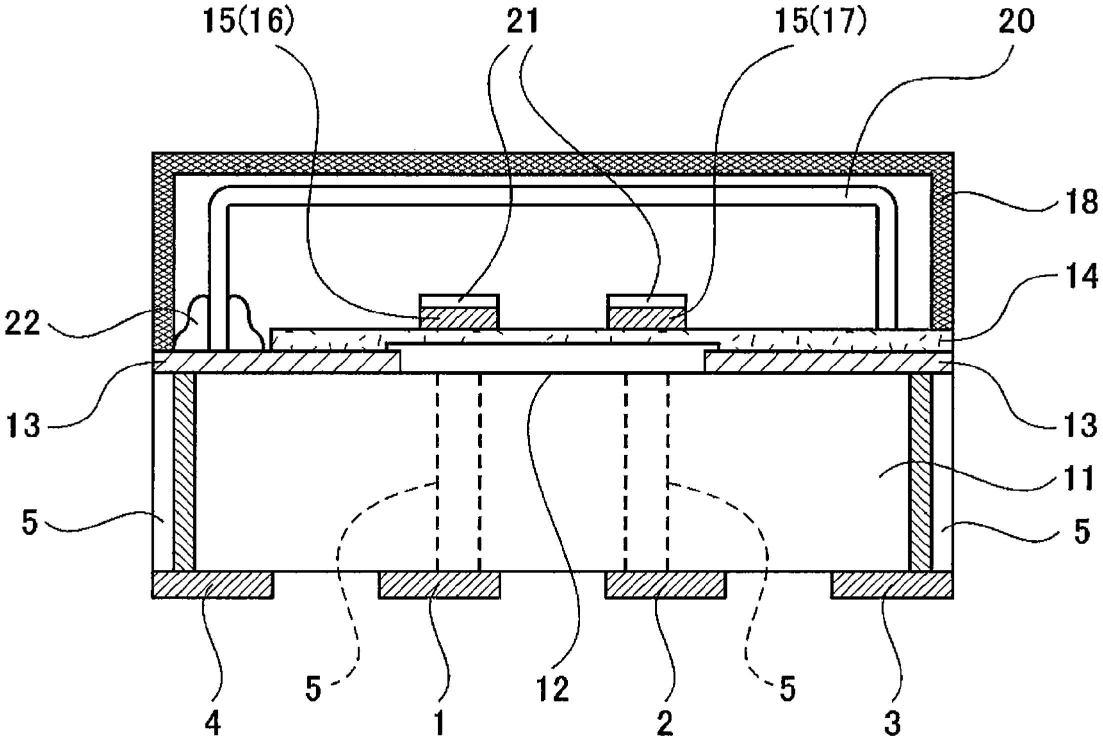
FIG. 4 is a cross-sectional side view illustrating the internal structure of the protective element and a structure subsequent to electric current interruption according to the first embodiment.

The protective element allows the operation described below as protection circuit operation including overvoltage operation. That is, the potential of the heat generation resistor terminal 3 decreases to a ground level in the protective element in response to an input of a prescribed interruption signal supplied from an external protection circuit in case of the unusual situation of the protection target device. Herein, the external protection circuit is, for example, formed of a switch such as a field-effect transistor. In the protective element, therefore, the electric current is flowed with respect to the heat generation resistor 12 from the current-carrying path having a potential higher than the ground, so that the heat generation resistor 12 generates the heat. Subsequently, the solder 21, firmly adhering the elastic member 20 and at least one of the current-carrying electrode terminals among the second conductor layers 15 and the current-carrying electrode terminals 16, 17 disposed in the vicinity of the heat generation resistor 12, is melted. Accordingly, the elastic member 20 becomes in a non-urging state by being separated from the second conductor layers 15 and the current-carrying electrode terminals 16, 17, so that the current-carrying path is interrupted as illustrated in FIG. 4. Herein, since the electric current to be flowed to the heat generation resistor 12 is supplied from the current-carrying path through the elastic member 20, the heat generation resistor 12 stops generating the heat in response to the interruption of the current-carrying path. Although FIG. 4 illustrates a situation in which the elastic member 20 is separated from all of the second conductor layers 15 and the current-carrying electrode terminals 16, 17, the current-carrying path can be interrupted in a case where the elastic member 20 is separated from any of the current-carrying electrode terminals. In the protective element, however, the elastic member 20 is likely to be separated from all of the second conductor layers 15 and the current-carrying electrode terminals 16, 17 simultaneously.

Moreover, in a case where overcurrent operation is performed in the protective element, the solder 21 and the elastic member 20 forming the current-carrying path are heated by flowing the current to the current-carrying path. For example, the current more than double the rated current is flowed to the current-carrying path. Accordingly, the solder 21 is melted, and the elastic member 20 becomes in a non-urging state by being separated from the second conductor layers 15 and the current-carrying electrode terminals 16, 17, so that the current-carrying path is interrupted as similar to the protection circuit operation.

Therefore, the protective element can allow the interruption of the current-carrying path in response to the operation of the elastic member 20, thereby preventing or reducing the overcurrent and the overvoltage.

The protective element allowing such operation can be produced by description below.

First, the substrate 11 including the heat generation resistor 12, the first conductor layer 13, the insulation layer 14, the second conductor layers 15, and the current-carrying electrode terminals 16, 17 is prepared using an existing wiring board production technology, and the solder 21 is applied on the current-carrying electrode terminals 16, 17 and a portion of the first conductor layer 13. Herein, the portion of the first conductor layer 13 is a location to which the elastic member 20 is to be soldered.

Second, one end of the elastic member 20 in the substantially U-shape is positioned on the insulation layer 14 while another end is positioned on the first conductor layer 13. The elastic member 20 is positioned and mounted in such a manner as to be laid across the second conductor layers 15 and the current-carrying electrode terminals 16, 17.

Third, the middle portion of the elastic member 20 in the substantially U-shape is flexed inward using, for example, a prescribed pressing jig, and the solders 21, 22 are heated in a state that the middle portion of the elastic member 20 is being in contact with the solder 21. The solders 21, 22 are cooled down immediately after being melted. Accordingly, the elastic member 20 is firmly adhered to the second conductor layers 15 as well as the current-carrying electrode terminals 16, 17 and the first conductor layer 13 in a state that the elastic member 20 is urged in the substantially M-shape. The heating process and the cool-down process can be performed by inserting a pre-completion element prepared into a prescribed heating reactor and cooling reactor or by heating and cooling the pressing jig. In a case where the electric current is applicable to the heat generation resistor 12, the elastic member 20 can be firmly adhered using the heat of the heat generation resistor 12 by applying and interrupting the electric current with respect to the heat generation resistor 12. Moreover, the use of a pressing head such as pinholder including a plurality of protrusions as the pressing jig allows the elastic member 20 to be mounted with respect to a plurality of respective elements simultaneously, thereby enhancing a yield rate.

Therefore, the protective element can be produced by firmly adhering the insulating housing 18 to the pre-completion element including the elastic member 20 mounted thereon According to the protective element described above, the elastic member 20 is used as the connection member of the current interruption potion unlike the related art manner using the fuse element made of the solder foil. Moreover, the solder 21 is used to connect the elastic member 20 to the second conductor layers 15 and the current-carrying electrode terminals 16, 17 of the electric current interruption portion. Accordingly, the lead-free can be ensured. The protective element, therefore, can ensure the responsiveness of the electric current interruption operation that is substantially similar to the related-art protective element using the fuse element even in a case where the solder 21 to be used has the liquid-phase point or the solid-phase point higher than the mounting temperature.

In the protective element, particularly, the elastic member 20 is soldered onto the second conductor layers 15 and the current-carrying electrode terminals 16, 17 in a state that the elastic member 20 maintains a level of the stress allowing at least one of the current-carrying electrode terminals among the second conductor layers 15 and the current-carrying electrode terminals 16, 17 to be separated from the elastic member 20 by deformation of the solder 21 even in a case where the solder 21 is not completely melted. Accordingly, the solder 21 does not need to be melted completely by the heat of the heat generation resistor 12 for the electric current interruption, and the elastic member 20 is physically separated from the second conductor layers 15 and the current-carrying electrode terminals 16, 17 by the stress of the elastic member 20 at a stage in which a certain amount of the solder 21 is melted. According to the protective element, therefore, a current range for operation of the heat generation resistor 12 can be greater than that of the related art protective element. Moreover, in a case where the solder 21 having a melting point substantially similar to that of the related art fuse element is used, the electric current is interrupted before the solder 21 is completely melted, thereby enhancing the responsiveness of the electric current interruption operation and improving the safety.

A description is now given of a protective element according to a second embodiment.

The protective element according to the second embodiment is similar to the protective element of the first embodiment described above except for the number of electrode terminals of an electric current interruption portion. Components and configurations similar to those of the above embodiment will be given the same reference numerals as above, and description thereof will be omitted.

Figure 5:
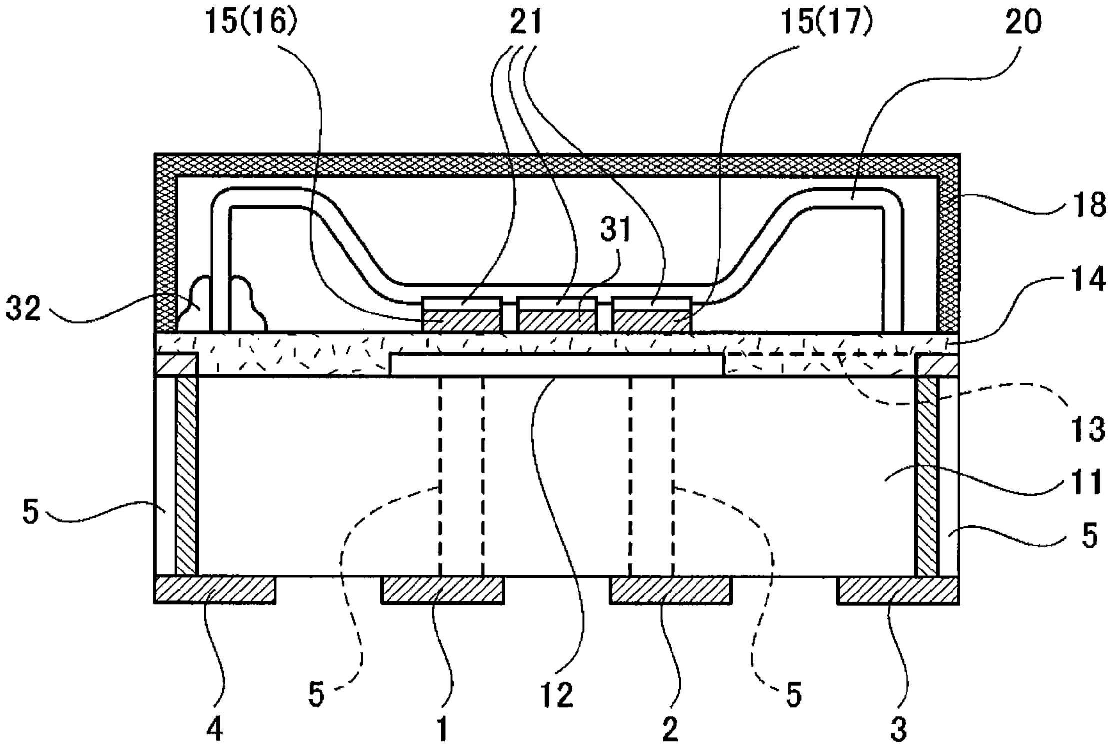
FIG. 5 is a cross-sectional side view illustrating an internal structure of a protective element according to a second embodiment.
Figure 6:
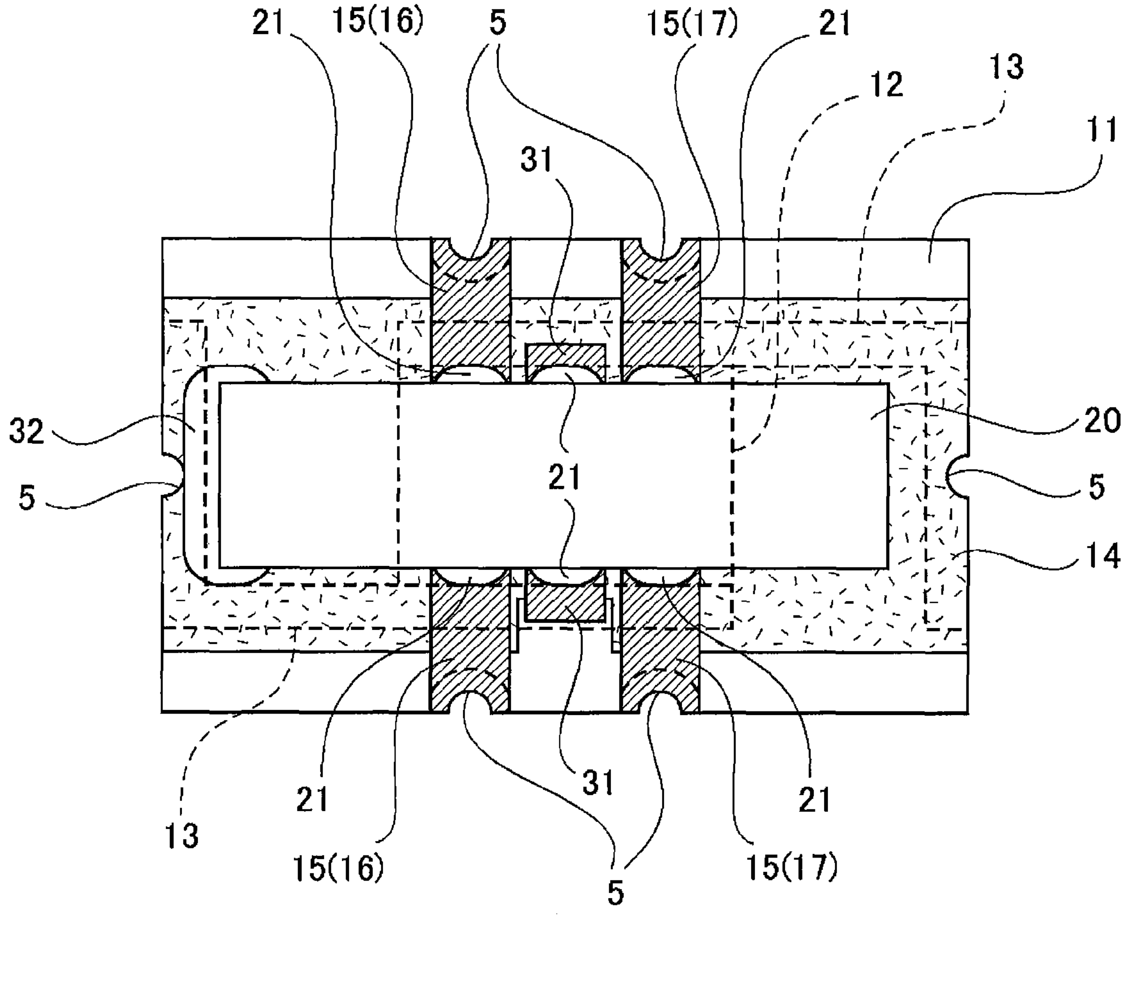
FIG. 6 is a plane view illustrating the internal structure of the protective element according to the second embodiment.

The protective element of the second embodiment includes an intermediate electrode terminal 31 disposed parallel to and between second conductor layers 15 and the current-carrying electrode terminals 16, 17 in such a manner as to form an electric current interruption portion dividing a current-carrying path into three as illustrated in a cross-sectional view of FIG. 5 and a plane view of FIG. 6.

The intermediate electrode terminal 31 is electrically connected to a path electrically connected to a non-connected mounting terminal 4 in a region outside in which an elastic member 20 is mounted, although the intermediate electrode terminal 31 is disposed in a state of being physically separated from a heat generation resistor 12 through an insulation layer 14 as similar to the second conductor layers 15 and the current-carrying electrode terminals 16, 17. The intermediate electrode terminal 31 is made of a material that is not particularly limited. However, the intermediate electrode terminal 31 is preferably made of metal having good wettability with a solder 21. Since the intermediate electrode terminal 31 is generally formed by a production process which is same as the production of the second conductor layers 15 and the current-carrying electrode terminal 16, 17, the intermediate electrode terminal 31 is formed of a material that is substantially the same as that of the second conductor layers 15 and the current-carrying electrode terminal 16, 17.

According to such a protective element, the elastic member 20 is disposed in a state of being firmly adhered to the second conductor layers 15 as well as the current-carrying electrode terminal 16, 17 and the intermediate electrode terminal 31. Like the first embodiment, the elastic member 20 is formed as a leaf spring member having conductivity, and is in a substantially letter U-shape when the elastic member 20 is not urged. The elastic member 20 in the substantially U-shape has two sides opposite to each other and has a side to be connected to the second conductor layers 15 as well as the current-carrying electrode terminals 16, 17 and the intermediate electrode terminal 31. In a case where such an elastic member 20 is used, the two sides opposite to each other are urged in such a manner that a middle portion of the side to be connected is flexed inward, so that the elastic member 20 as a whole is formed in a substantially letter M-shape. The middle portion of the side is firmly adhered to the second conductor layers 15 as well as the current-carrying electrode terminals 16, 17 and the intermediate electrode terminal 31 through the solder 21 in a state that the elastic member 20 is urged in the substantially M-shape. Accordingly, the elastic member 20 is electrically connected to the second conductor layers 15, the current-carrying electrode terminals 16, 17, and the intermediate electrode terminal 31. Moreover, the elastic member 20 includes one end positioned on the insulation layer 14, and includes another end firmly adhered to the insulation layer 14 through a prescribed adhesive agent 32. That is, the protective element includes the intermediate electrode terminal 31 connected to the heat generation resistor 12, so that the current-carrying path is formed by the elastic member 20 without connecting the elastic member 20 and the first conductor layer 13 electrically through the solder 22. Like the first embodiment described above, the elastic member 20 needs to be soldered onto the second conductor layers 15 as well as the current-carrying electrode terminals 16, 17 and the intermediate electrode terminal 31 in a state that the elastic member 20 maintains a level of a stress (urging force) allowing at least one of the current-carrying electrode terminals among the second conductor layers 15 as well as the current-carrying electrode terminals 16, 17 and the intermediate electrode terminal 31 to be separated from the elastic member 20 by deformation of the solder 21 even in a case where the solder 21 is not completely melted.

Figure 7:
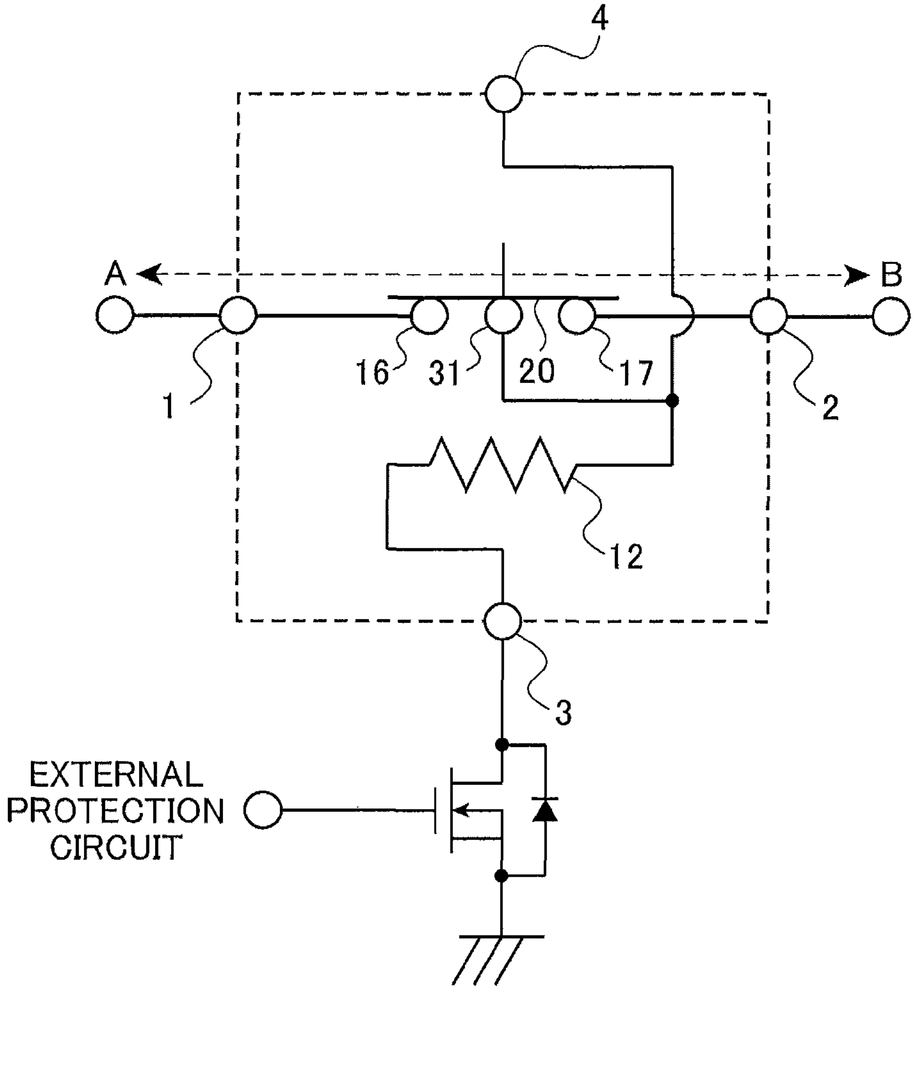
FIG. 7 is a schematic diagram illustrating a circuit structure of the protective element according to the second embodiment.

Referring to FIG. 7, a circuit structure of the protective element according to the second embodiment is illustrated. The protective element includes a current-carrying path A-B including the second conductor layers 15, the current-carrying electrode terminals 16, 17, the intermediate electrode terminal 31, and the elastic member 20 disposed between at least the current-carrying path terminals 1, 2. According to the protective element, the electric current is applied to the heat generation resistor 12 through the current-carrying path A-B including the elastic member 20 and the intermediate electrode terminal 31. In the protective element, therefore, when the heat generation resistor 12 generates the heat by the electric current applied from the current-carrying path A-B, the solder 21 is melted. Herein, the solder 21 is connecting the elastic member 20 and at least one of the current-carrying electrode terminals among the second conductor layers 15, the current-carrying electrode terminals 16, 17, and the intermediate terminal 31.

Figure 8:
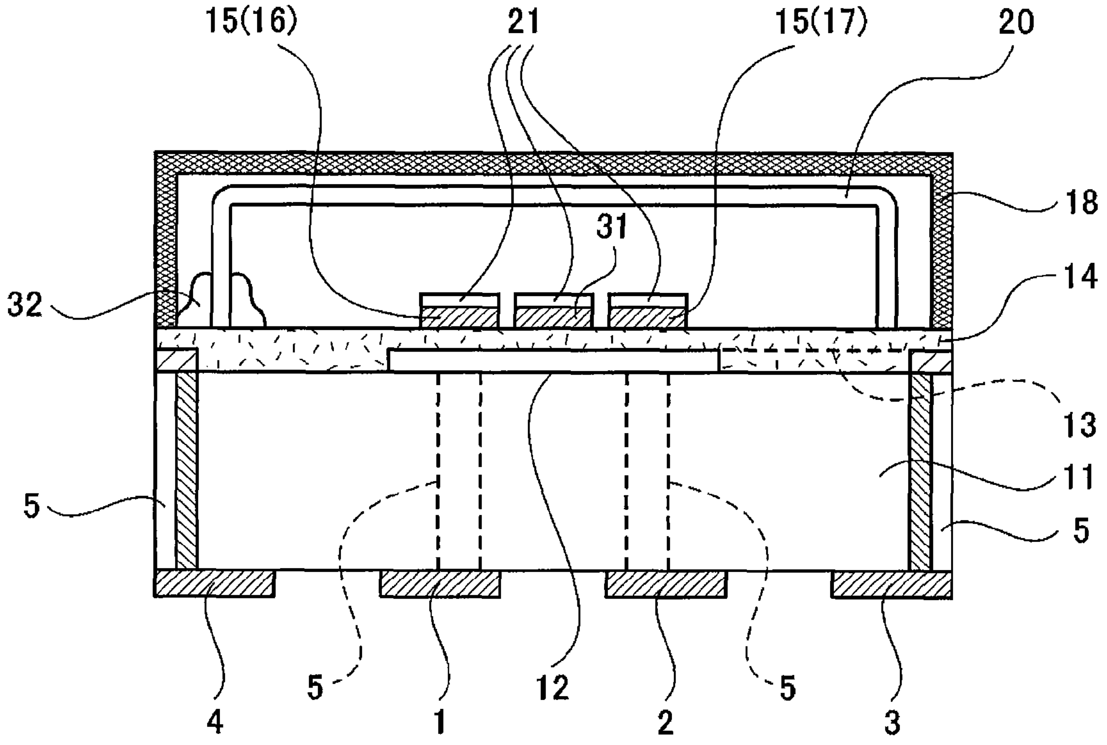
FIG. 8 is a cross-sectional side view illustrating the internal structure of the protective element and a structure subsequent to electric current interruption according to the second embodiment.

In a case where protection circuit operation including overvoltage operation is performed in the protective element of the second embodiment like the operation described above in the first embodiment, the potential of the heat generation resistor terminal 3 decrease to a ground level in response to an input of a prescribed interruption signal supplied from an external protection circuit in case of the unusual situation of the protection target device. In the protective element, therefore, the electric current is flowed with respect to the heat generation resistor 12 through the intermediate electrode terminal 31 from the current-carrying path having a potential higher than the ground, so that the heat generation resistor 12 generates the heat. Subsequently, the solder 21, firmly adhering the elastic member 20 and at least one of the current-carrying electrode terminals among the second conductor layers 15 as well as the current-carrying electrode terminals 16, 17 and the intermediate electrode terminal 31 disposed in the vicinity of the heat generation resistor 12, is melted. Accordingly, the elastic member 20 becomes in a non-urging state by being separated from the second conductor layers 15 as well as the current-carrying electrode terminals 16, 17 and the intermediate electrode terminal 31, so that the current-carrying path is interrupted as illustrated in FIG. 8. Herein, since the electric current to be flowed to the heat generation resistor 12 is supplied from the current-carrying path through the intermediate electrode terminal 31, the heat generation resistor 12 stops generating the heat in response to the interruption of the current-carrying path. Although FIG. 8 illustrates a situation in which the elastic member 20 is separated from all of the second conductor layers 15 as well as the current-carrying electrode terminals 16, 17 and the intermediate electrode terminal 31, the current-carrying path can be interrupted in a case where the elastic member 20 is separated from any one of the current-carrying electrode terminals. Particularly, in a case where the heat generation resistor 12 is positioned directly below the intermediate electrode terminal 31 in the protective element, the intermediate electrode terminal 31 is designed to be disposed between the second conductor layers 15 and the current-carrying electrode terminals 16, 17, so that any of the second conductor layers 15 and the current-carrying electrode terminals 16, 17 is surely separated from the elastic member 20 first without separating only the intermediate electrode terminal 31 from the elastic member 20. Therefore, the protective element can prevent or reduce a trouble in which the heat generation resistor 12 stops generating the heat before the electric current is interrupted.

Moreover, in a case where overcurrent operation is performed in the protective element of the second embodiment like the operation described above in the first embodiment, the solder 21 and the elastic member 20 forming the current-carrying path are heated by flowing the current to the current-carrying path. For example, the current more than double the rated current is flowed to the current-carrying path. Accordingly, the solder 21 is melted, and the elastic member 20 becomes in a non-urging state by being separated from the second conductor layers 15 and the current-carrying electrode terminals 16, 17 and/or the intermediate electrode terminal 31, so that the current-carrying path is interrupted as similar to the protection circuit operation.

Therefore, the protective element can allow the interruption of the current-carrying path in response to the operation of the elastic member 20, thereby preventing or reducing the overcurrent and the overvoltage.

The protective element allowing such operation can be produced by description below.

First, the substrate 11 including the heat generation resistor 12, the first conductor layer 13, the insulation layer 14, the second conductor layers 15, the current-carrying electrode terminals 16, 17, and the intermediate electrode terminal 31 is prepared using an existing wiring board production technology, and the solder 21 is applied on the second conductor layers 15 as well as the current-carrying electrode terminals 16, 17 and intermediate electrode terminal 31.

Second, both ends of the elastic member 20 in the substantially U-shape are positioned on the insulation layer 14, and the adhesive agent 32 is applied to one of the ends of the elastic member 20 in a state that the elastic member 20 is positioned and mounted in such a manner as to be laid across the second conductor layers 15 and the current-carrying electrode terminals 16, 17.

Third, the middle portion of the elastic member 20 in the substantially U-shape is flexed inward using a prescribed pressing jig, and the solder 21 is heated in a state that the middle portion of the elastic member 20 is being in contact with the solder 21 like the first embodiment described above. The solder 21 is cooled down promptly after being melted. Accordingly, the elastic member 20 is firmly adhered to the second conductor layers 15 as well as the current-carrying electrode terminals 16, 17 and the intermediate electrode terminal 31 in a state that the elastic member 20 is urged in the substantially M-shape. The solder 21 is heated, and the adhesive agent 32 is hardened at the same time.

Therefore, the protective element can be produced by firmly adhering an insulating housing 18 to the pre-completion element including the elastic member 20 mounted thereon.

Accordingly, even in a case where the number of the electrode terminals is increased, the protective element can allow the electric current interruption operation using the elastic member 20 and can ensure the lead-free thereof. Therefore, even in a case where the solder 21 to be used has the liquid-phase point or the solid-phase point higher than the mounting temperature, the protective element of the second embodiment can ensure the responsiveness of the electric current interruption operation which is substantially similar to or greater than that of the related art protective element using the fuse element.

The protective element is, for example, suitable for a battery pack removable with respect to an electronic device such as a laptop computer, and is suitable as a chip type protective element to be mounted on a substrate of the protection target device by the reflow soldering.

The usage of the lead-free solder is preferred according to each of the embodiments described above. The embodiments, however, are not intended to stick to types of the solders. The embodiments can be applied to a leaded solder.

According to each of the embodiments described above, the electrode terminals are disposed on the heat generation resistor through the insulation layer. The embodiments, however, can allow positions of the heat generation resistor and the electrode terminals to be optionally arranged. For example, the heat generation resistor and the electrode terminals can be disposed on the same plane surface as long as the elastic member and the plural electrode terminals forming the current-carrying path are soldered together.

According to each of the above embodiments, one heat generation resistor is disposed. The embodiments, however, can allow a plurality of heat generation resistors to be disposed, or can allow the heat generation resistor to be disposed to outside the protective element as long as the heat generation resistor is disposed in the vicinity of the electrode terminal to melt the solder with heat thereof. Moreover, in a case where the protective element of the present invention is provided to prevent or reduce the overcurrent, the heat generation resistor may not be necessarily disposed.

According to the above embodiments, moreover, two or three electrode terminals are disposed. The embodiments, however, can allow the number of electrode terminals to be optionally determined as long as the elastic member and the plural electrode terminals forming the current-carrying path are soldered.

Moreover, the embodiments preferably include a heat insulating layer, for suppressing the heat release, in a lower power portion of the heat generation resistor. For example, the heat insulating layer is a glass layer. In such a case, the heat insulating layer can be formed by printing the glass paste on the substrate 11 described above and firing at an approximately 850 degrees Celsius.

According to each of the embodiments described above, the elastic member having conductivity is in a substantially letter U-shape when being not urged. The embodiments, however, can allow an elastic member having an optional shape to be used as long as the elastic member and the plural electrode terminals forming the current-carrying path are soldered. Particularly, a description is given, with reference to FIG. 9 and FIG. 10, of a case where one flat plate member having conductivity is used as an elastic member instead of the elastic member 20 described above in the second embodiment.

Figure 9:
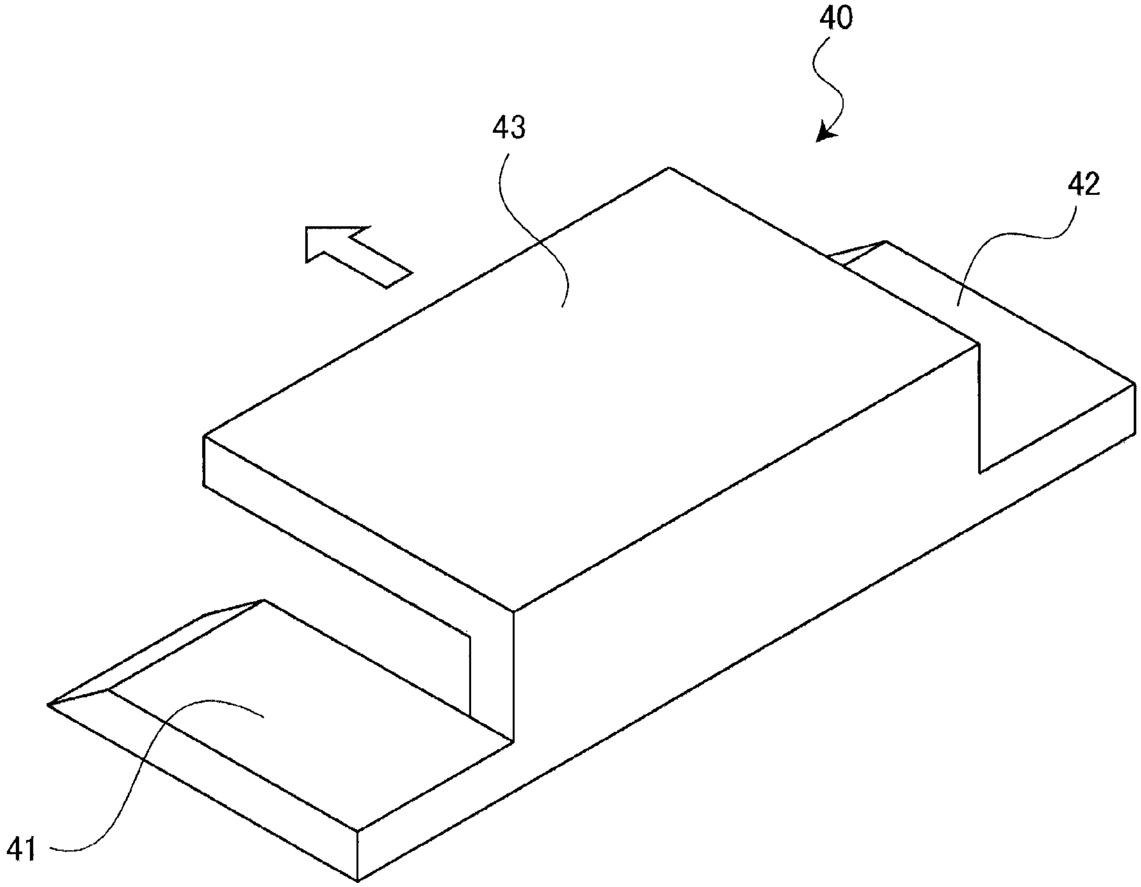
FIG. 9 is a perspective view illustrating a structure of a stand-off member.

In such a protective element, a stand-off member 40 as illustrated in FIG. 9 is used in order that the elastic member formed of the flat plate member is flexed and urged. The stand-off member 40 is, for example, made of a material having an insulation property such as 46-nylon or liquid crystal polymer. The stand-off member 40 includes: two wedge members 41 and 42 each of which has a leading end formed in a wedged shape; and a member 43 including both ends each of which is formed in a reversed L shape in cross section. A shape of the stand-off member 40 is formed by combining the two wedge members 41 and 42 with the respective ends of the member 43. The stand-off member 40 is formed in such a manner that a space is provided between upper surfaces of the respective wedge members 41 and 42 and a bottom surface of a horizontal portion forming the member 43 of the reversed L shape.

Figure 10:
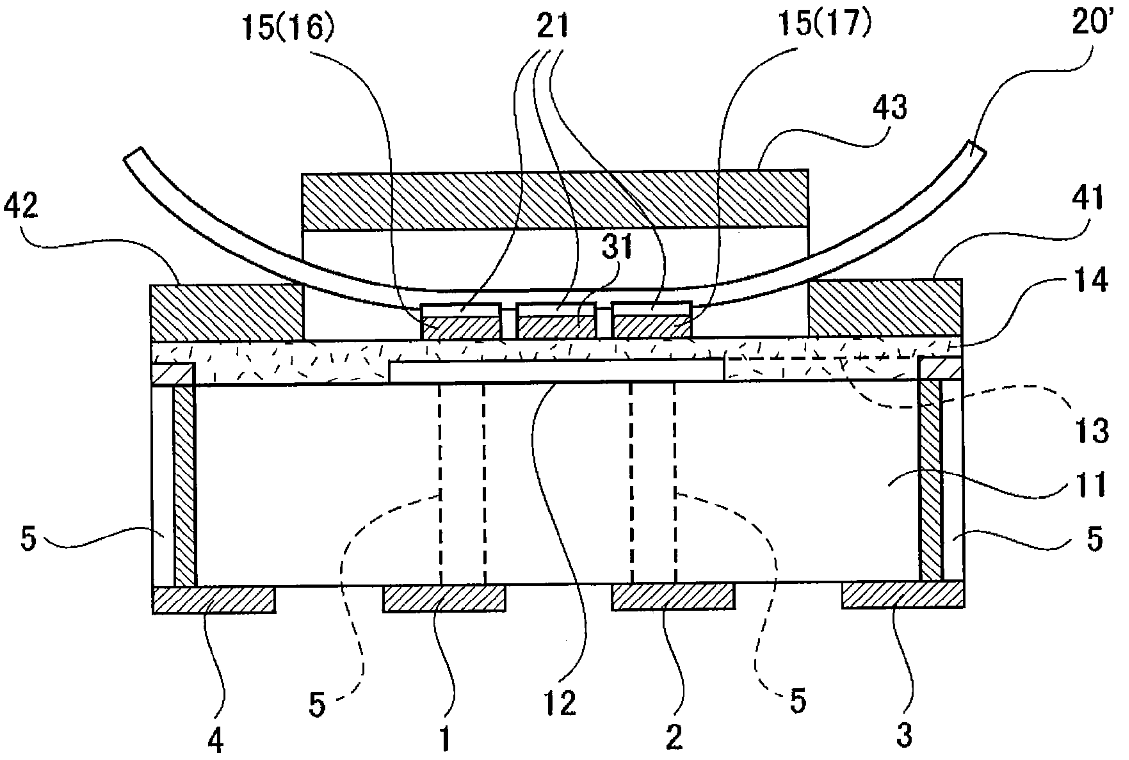
FIG. 10 is a cross-sectional side view illustrating the internal structure of the protective element using the stand-off member.

In the protective element, the solder 21 is heated and melted in a state that an elastic member 20' formed of the flat plate member is mounted on the second conductor layers 15 as well as the current-carrying electrode terminals 16, 17 and the intermediate electrode terminal 31 on each of which the solder 21 is applied. The solder 21 is cooled down immediately after being melted, and the elastic member 20' is firmly adhered to the second conductor layers 15 as well as the current-carrying electrode terminals 16, 17 and the intermediate electrode terminal 31. Accordingly, the second conductor layers 15 as well as the current-carrying electrode terminals 16, 17 and the intermediate electrode terminal 31 are electrically connected. The protective element allows the stand-off member 40 to slide in a direction indicated by an arrow shown in FIG. 9, thereby urging the elastic member 20' as a whole in a substantially U-shape by flexing the middle portion of the elastic member 20' as illustrated in FIG. 10. The elastic member 20' needs to be soldered onto the second conductor layers 15, the current-carrying electrode terminals 16, 17, and the intermediate electrode terminal 31 in a state that the elastic member 20' maintains a level of the stress allowing at least one of the current-carrying electrode terminals among the second conductor layers 15, the current-carrying electrode terminals 16, 17, and the intermediate electrode terminal 31 to be separated from the elastic member 20' by deformation of the solder 21 even in a case where the solder 21 is not completely melted as similar to the first and second embodiments described above.

In the protective element, the stand-off member 40 also functions as a substitute for the insulation housing 18 since the elastic member 20' is positioned within the space between the upper surfaces of the respective wedge members 41 and 42 and the bottom surface of the horizontal portion forming the member 43 of the reversed L shape.

The protective element allowing such operation can be produced by description below.

First, the substrate 11 including the heat generation resistor 12, the first conductor layer 13, the insulation layer 14, the second conductor layers 15, the current-carrying electrode terminals 16, 17, and the intermediate electrode terminal 31 is prepared using an existing wiring board production technology, and the solder 21 is applied on the second conductor layers 15 as well as the current-carrying electrode terminals 16, 17 and intermediate electrode terminal 31. The elastic member 20' formed of the flat plate member is positioned and mounted on the solder 21 in such a manner as to be laid across the second conductor layers 15 as well as the current-carrying electrode terminals 16, 17 and the intermediate electrode terminal 31.

Second, the solder 21 is heated and melted in a state that the elastic member 20' is being mounted. The solder 21 is cooled down immediately after being melted. Accordingly, the elastic member 20' is firmly adhered to the second conductor layers 15 as well as the current-carrying electrode terminals 16, 17, and the intermediate electrode terminal 31.

Third, the stand-off member 40 is slid in such a manner that the elastic member 20' is positioned within the space between the upper surfaces of the respective wedge members 41 and 42 and the bottom surface of the horizontal portion forming the member 43 of the reversed L shape. The middle portion of the elastic member 20' is flexed, thereby allowing the elastic member 20' to be urged in the substantially U-shape. Accordingly, the protective element is produced.

The embodiments, therefore, can enable an elastic member having an optional shape to be employed as long as the elastic member and the plural electrode terminals forming the current-carrying path are soldered. According to the embodiments, the stand-off member 40 includes the two wedge members disposed in the same direction in order that the elastic member is set to be urged as illustrated in FIG. 9. However, the embodiments can enable a stand-off member including wedge members disposed in a direction opposite from the direction of FIG. 9 to be employed, and the stand-off member of the opposite direction can be rotated and set. A shape of the stand-off member is not limited thereto as long as the elastic member is allowed to be urged. Moreover, the stand-off member can be a portion of wedge member for allowing the elastic member to be flexed and urged as the wedge members 41 and 42 illustrated in FIG. 9 as long as the a case member corresponding to the insulation housing is separately disposed.

Example

Figure 11:
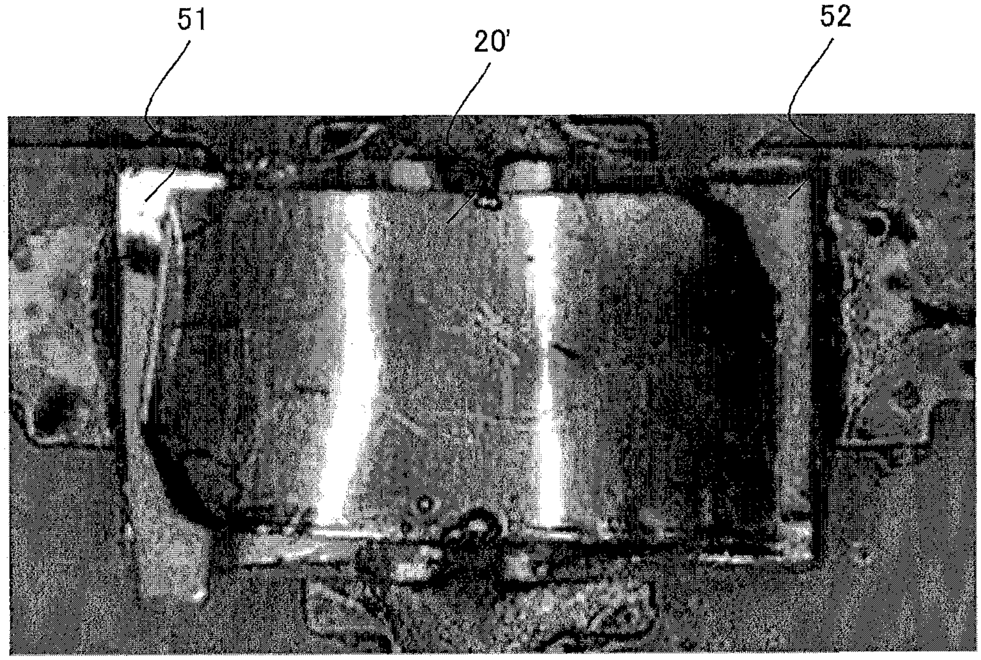
FIG. 11 is a plane view illustrating a protective element produced as an example.
Figure 12:
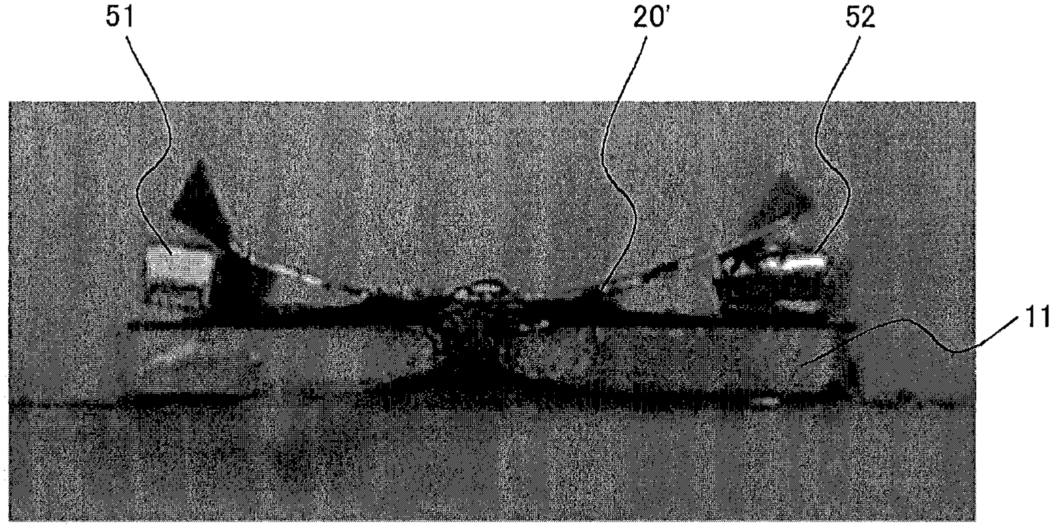
FIG. 12 is a side view illustrating the protective element of FIG. 11.
Figure 13:
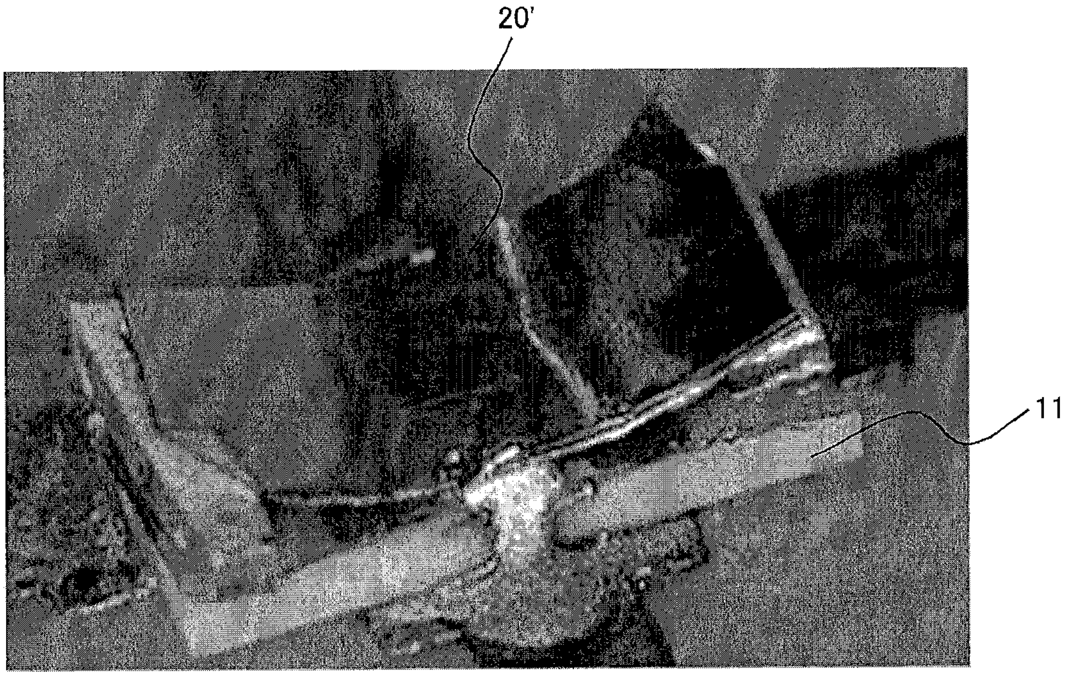
FIG. 13 is a perspective view illustrating the protective element of FIG. 11.

The protective element was produced based on the structure illustrated in FIG. 10. Particularly, two wedge members 51 and 52 corresponding to the wedge members 41 and 42 described above were prepared as the stand-off member 40 as illustrated in FIG. 11 through FIG. 13. The wedge members 51 and 52 were inserted below a lower surface of the elastic member 20' and the middle portion of the elastic member 20' was flexed and urged in a substantially U-shape. The elastic member 20' was formed of a flat plate member made of phosphor bronze C5191-H, and had a thickness of 0.05 mm, a width of approximately 2.5 mm, and a length of approximately 5 mm.

Figure 14:
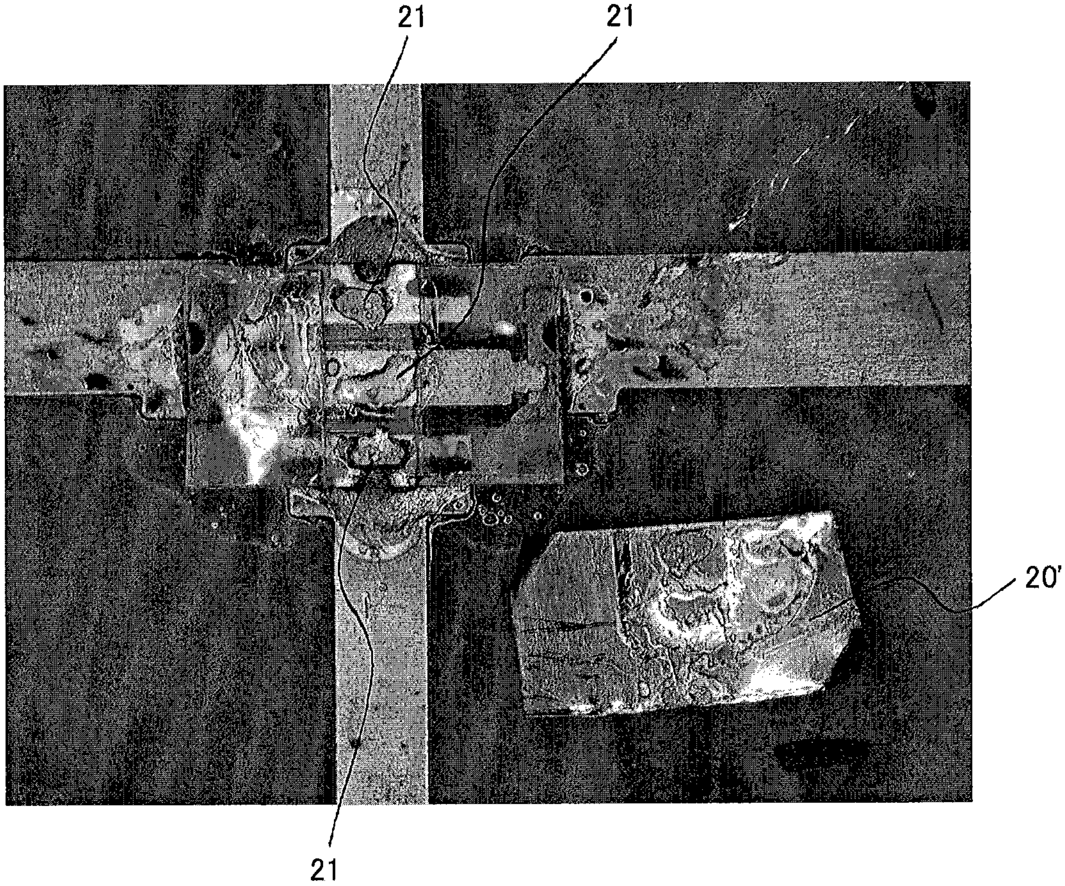
FIG. 14 is a plane view illustrating the protective element subsequent to electric current interruption operation.

First, the protective element was heated using prescribed heat generation testing equipment, and the electric current interruption operation was evaluated. The testing equipment has a heater corresponding to the heat generation resistor 12, and the heater is designed to generate the heat when electric current is applied through a current-carrying path of the protective element. The heater has a resistance value of 13.03Ω. The operation test was conducted by applying electric current with operation power of 22 W. As a result, the elastic member 20' jumped in 0.43 m seconds from the beginning of the application of the electric current as illustrated in FIG. 14, and such a phenomenon was confirmed. After the operation, the heater had a resistance value of 13.0Ω while the protective element had a resistance value of infinity. Accordingly, the electric current interruption operation was confirmed.

Moreover, the protective element was actually applied with the electric current using prescribed overcurrent operation testing equipment, and the electric current interruption operation was evaluated. The operation test was conducted by applying the electric current of 20 A. As a result, the elastic member 20' jumped in approximately 45 seconds from the beginning of the application of the electric current, and such a phenomenon was confirmed as similar to a case of the heat generation test.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A protective element for interrupting electric current, the protective element comprising:

an elastic member firmly adhered through a solder to a plurality of electrode terminals formed on a prescribed substrate in such a manner that a current-carrying path is divided into plural to form an electric current interruption portion, wherein the solder has a liquid-phase point higher than a mounting temperature at which the protective element is mounted to a protection target device, the liquid-phase point being higher than or equal to 260 degrees Celsius, wherein the elastic member is soldered onto the plurality of electrode terminals in a state that the elastic member maintains a level of stress allowing at least one of the plural electrode terminals to be separated therefrom by deformation of the solder even in a state where that the solder is not completely melted, wherein the elastic member is formed as a leaf spring member having conductivity and is in a substantially U-shape when being not urged, and wherein the elastic member includes a flexed portion to be firmly adhered to the plural electrode terminals through the solder in a state that the elastic member as a whole is urged in a substantially M-shape by flexing a side to be connected by urging two sides opposite to each other of the elastic member in the substantially U-shape.

2. The protective element according to claim 1, wherein the elastic member is separated from at least one of the plural electrode terminals by melting the solder by heat of a heat generation resistor applied with the electric current in case of an unusual situation, and interrupts the electric current being flowed in the current-carrying path.

3. The protective element according to claim 1, wherein the elastic member is separated from at least one of the plural electrode terminals by melting the solder by heating the elastic member and the solder when overcurrent is flowed to the current-carrying path, and interrupts the electric current being flowed in the current-carrying path.

4. The protective element according to claim 1, wherein the elastic member is formed of a flat plate member and allows a flexed portion thereof to be firmly adhered to the plural electrode terminal through the solder in a state that elastic member is flexed using a prescribed stand-off member and is urged as a whole in a substantially U-shape.

5. The protective element according to claim 1, wherein the elastic member includes an insulation housing covering the elastic member in such a manner as to protect and regulate a behavior range of the elastic member.

6. The protective element according to claim 1, wherein the substrate is a circuit board made of a material having an insulation property.

7. The protective element according to claim 6, wherein the substrate is a ceramic substrate.

8. The protective element according to claim 2, wherein the heat generation resistor is supplied with the electric current from the current-carrying path.

9. The protective element according to claim 2, wherein the heat generation resistor is disposed within a distance in which the solder firmly adhering the plural electrode terminals and the elastic member is melted.

10. The protective element according to claim 9, wherein the heat generation resistor is disposed directly below a portion in which at least the elastic member is laid across the plural electrode terminals.

11. The protective element according to claim 2, comprising the heat generation resistor.

12. The protective element according to claim 2, wherein the heat generation resistor is disposed to an outer portion of the protective element.

13. The protective element according to claim 2, wherein the elastic member includes one of ends thereof being firmly adhered through the solder to a heat generation resistor electrode terminal allowing the electric current to be applied to the heat generation resistor.

14. The protective element according to claim 2, wherein the elastic member includes at least one of ends thereof being firmly adhered through an adhesive agent to a heat generation resistor electrode terminal allowing the electric current to be applied to the heat generation resistor.

15. A method for producing a protective element for interrupting an electric current, the method comprising:

a first step of applying a solder, having a liquid-phase point higher than a mounting temperature at which the protective element is mounted to a protection target device, on a plurality of electrode terminals formed on a prescribed substrate in such a manner that a current-carrying path is divided into plural to form an electric current interruption portion;

a second step of, mounting a prescribed elastic so as to be laid across the plural electrode terminals applied with the solder; and a third step of adhering the elastic member firmly to the plural electrode terminals in a state that the elastic member is urged by allowing the solder to be cooled down after being heated and melted in a state that the elastic member is flexed in contact with the solder, wherein the third step allows the elastic member to be soldered onto the electrode terminals in a state that the elastic member maintains a level of stress allowing at least one of the plural electrode terminals to be separated therefrom by deformation of the solder even in a state that the solder is not completely melted.

16. A method for producing a protective element for interrupting an electric current, the method comprising:

a first step of applying a solder, having a liquid-phase point higher than a mounting temperature at which the protective element is mounted to a protection target device, to a plurality of electrode terminals formed on a prescribed substrate in such a manner that a current-carrying path is divided into plural to form an electric current interruption portion;

a second step of mounting a prescribed elastic member to so as to be laid across the plural electrode terminals applied with the solder;

a third step of adhering the elastic member firmly to the plural electrode terminals by allowing the solder to be cooled down after the solder is heated and melted in a state that the elastic member is mounted on the solder; and a forth step of flexing and urging the elastic member a prescribed stand-off member, wherein the third step enables the elastic member to be soldered onto the electrode terminals in a state that the elastic member maintains a level of stress allowing at least one of the plural electrode terminals to be separated therefrom by deformation of the solder even in a state that the solder is not completely melted.

17. A protective element for interrupting electric current, the protective element comprising:

an elastic member firmly adhered through a solder to a plurality of electrode terminals formed on a prescribed substrate in such a manner that a current-carrying path is divided into plural to form an electric current interruption portion, wherein the solder has a liquid-phase point higher than a mounting temperature at which the protective element is mounted to a protection target device, the liquid-phase point being higher than or equal to 260 degrees Celsius, wherein the elastic member is soldered onto the electrode terminals in a state that the elastic member maintains a level of stress allowing at least one of the plural electrode terminals to be separated therefrom by deformation of the solder even in a state where that the solder is not completely melted, wherein the elastic member is formed of a flat plate member and allows a flexed portion thereof to be firmly adhered to the plural electrode terminal through the solder in a state that the elastic member is flexed using a prescribed stand-off member and is urged as a whole in a substantially U-shape.

* * * * *